US009609377B2

(12) United States Patent
Hale et al.

(10) Patent No.: US 9,609,377 B2
(45) Date of Patent: *Mar. 28, 2017

(54) STREAMING OF DIGITAL DATA TO A PORTABLE DEVICE

(71) Applicant: Disney Enterprises, Inc., Burbank, CA (US)

(72) Inventors: Greg B. Hale, Orlando, FL (US); Phu V. Nguyen, Orlando, FL (US); William G. Wiedefeld, Clermont, FL (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/728,145

(22) Filed: Jun. 2, 2015

(65) Prior Publication Data

US 2015/0264419 A1    Sep. 17, 2015

Related U.S. Application Data

(63) Continuation of application No. 14/109,875, filed on Dec. 17, 2013, now Pat. No. 9,077,461, which is a (Continued)

(51) Int. Cl.
*H04N 7/16* (2011.01)
*H04N 21/41* (2011.01)
(Continued)

(52) U.S. Cl.
CPC ........ *H04N 21/4126* (2013.01); *H04H 20/86* (2013.01); *H04N 7/15* (2013.01);
(Continued)

(58) Field of Classification Search
CPC .......... H04N 21/4104; H04N 21/4126; H04N 21/4222
See application file for complete search history.

(56) References Cited

U.S. PATENT DOCUMENTS 5,550,579 A * 8/1996 Martinez ............... G01S 13/878
  348/E7.024
5,553,064 A * 9/1996 Paff ........................ H04L 7/042
  348/E7.049

(Continued)

*Primary Examiner* — Pankaj Kumar
*Assistant Examiner* — Timothy Newlin
(74) *Attorney, Agent, or Firm* — Patent Ingenuity, P.C.; Samuel K. Simpson (57) ABSTRACT

The present invention achieves wireless delivery of media streams to portable devices for providing media information related to a show or attraction for the purposes of captioning, language translation, and assistive listening. As a person moves about a venue, the device receives infrared or radio signals from transmitters at venue locations. The device decodes each signal as venue location, event time, or device trigger for presentation on the device. The device memory contains audio, text, graphics and device playback may contain one or many of these stored contents. The stored content is synchronized with the user's location, time of travel, time of day, time of a show, or an event in a show and may be in one or many languages. Presentation of stored content on the device may also be altered by user preference, stored logic constraints, automatic learning of user behavior, or user interaction with other devices.

20 Claims, 7 Drawing Sheets

Related U.S. Application Data continuation of application No. 10/692,513, filed on Oct. 24, 2003, now Pat. No. 8,634,030.

(60) Provisional application No. 60/421,255, filed on Oct. 25, 2002.

(51) Int. Cl.

| | | |
|---|---|---|
| H04N 21/422 | (2011.01) | |
| H04N 7/15 | (2006.01) | |
| H04N 7/18 | (2006.01) | |
| H04H 20/86 | (2008.01) | |
| H04N 21/43 | (2011.01) | |
| H04N 21/81 | (2011.01) | |
| H04N 21/414 | (2011.01) | |
| H04N 21/4363 | (2011.01) | |
| H04N 21/45 | (2011.01) | |
| H04N 21/475 | (2011.01) | |
| H04N 21/488 | (2011.01) | |
| H04N 21/4367 | (2011.01) | |

(52) U.S. Cl.
CPC ............ H04N 7/16 (2013.01); H04N 7/18 (2013.01); H04N 21/4104 (2013.01); H04N 21/41415 (2013.01); H04N 21/4222 (2013.01); H04N 21/4302 (2013.01); H04N 21/4307 (2013.01); H04N 21/4363 (2013.01); H04N 21/4524 (2013.01); H04N 21/4532 (2013.01); H04N 21/4755 (2013.01); H04N 21/488 (2013.01); H04N 21/8106 (2013.01); H04N 21/8133 (2013.01); H04N 21/4367 (2013.01); H04N 21/4884 (2013.01)

(56) References Cited

U.S. PATENT DOCUMENTS

| | | | | |
|---|---|---|---|---|
| 5,589,872 | A * | 12/1996 | Martinez | G01S 13/878 348/E7.024 |
| 5,596,361 | A * | 1/1997 | Martinez | G01S 13/878 348/E7.024 |
| 5,828,403 | A * | 10/1998 | DeRodeff | H04N 7/17309 348/E7.07 |
| 6,012,961 | A * | 1/2000 | Sharpe, III | A63H 3/28 446/175 |
| 6,278,499 | B1 * | 8/2001 | Darbee | G06F 3/147 348/734 |
| 2002/0019984 | A1 * | 2/2002 | Rakib | G08B 13/19656 725/111 |
| 2002/0053085 | A1 * | 5/2002 | Toguri | H04N 21/235 725/51 |
| 2002/0122137 | A1 * | 9/2002 | Chen | H04N 5/38 348/552 |
| 2002/0152464 | A1 * | 10/2002 | Kitsukawa | H04N 7/17318 725/46 |
| 2003/0148705 | A1 * | 8/2003 | Chan | A63H 3/52 446/484 |
| 2003/0162475 | A1 * | 8/2003 | Pratte | A63H 3/28 446/175 |
| 2004/0246372 | A1 * | 12/2004 | Megeid | H04N 7/163 348/384.1 |
| 2014/0106664 | A1 * | 4/2014 | Hale | H04N 7/15 455/3.06 |

* cited by examiner

STREAMING OF DIGITAL DATA TO A PORTABLE DEVICE

RELATED APPLICATIONS

This continuation patent application claims priority to U.S. Provisional Patent Application Ser. No. 60/421,255 entitled "Streaming of Digital Data to a Portable Device", filed on Oct. 25, 2002, U.S. patent application Ser. No. 10/692,513 entitled "Streaming of Digital Data to a Portable Device" filed on Oct. 24, 2003, and U.S. patent application Ser. No. 14/109,875 entitled "Streaming of Digital Data to a Portable Device," filed on Dec. 17, 2013. This continuation patent application incorporates by reference U.S. Provisional Patent Application Ser. No. 60/421,255, U.S. patent application Ser. No. 10/692,513, and U.S. patent application Ser. No. 14/109,875 in their entireties.

BACKGROUND

I. 1. Field of the Invention

The present invention relates generally to the use of infrared and/or radio frequencies to stream digital data to portable devices in a mass audience or in designated broadcast area.

II. 2. Description of the Background Art

There are several circumstances which may interfere with a person's ability to hear, and thereby interfere with the presentation of information to the listener. For example, persons with hearing loss may miss narratives, sound effects, music and other sound material related to the presentation, and messages in live performances, films, television and special events. Persons who do not speak the language or languages used in the presentation may miss narratives and other related messages that are presented. The language barrier prevents many people from different cultures and languages from understanding, participating or interacting with the information being presented. Background environmental noise may also affect a person's ability to hear, and thereby diminish the effect of the presentation. Additionally, presentations often could be made more effective if they included a method to provide interactivity between the audience and the presenter(s).

Captioning systems have been used in many venues including museums, theaters and other auditoriums to provide foreign language translation or captioning for the hearing impaired. These systems are either 1) "open captioning" on a projected surface or large adjacent display area where the entire audience can see the captioning; 2) reflective captioning using a transparent but reflective panel to display the text from a rear projection while allowing the viewer to see the display or performance through the panel; or, 3) hard-wired displays in the back of the seat in front of the viewer.

Wireless streaming systems also exist. These consist of modulated analog and digitized audio broadcasting systems such as assistive listening systems and wireless headphones. Also short-range (often 1 meter or less) digital transceivers are typically used to exchange data between computers or between computers and peripherals. These systems do not synchronize multiple units.

SUMMARY OF THE INVENTION

It is therefore an object of this invention to provide a method of presenting random and/or synchronized information such as narratives, translations, interactive games, control signal commands or other show related messages, to patrons of shows, movie theaters, exhibit halls, auditoriums and/or designated areas through an unobtrusive device.

The present invention makes use of infrared (IR) emission and/or radio frequency (RF) transmission to stream data to a portable device for closed captioning, language translation for multi-cultural language groups, previews, games, control of devices and/or similar applications. The portable captioning device could be carried by a person and/or the device could be placed in a fixture for hands free use. Before or at the time of the start of a presentation or presentations, the IR/RF system will start the transmission of data to the portable units. The transmission will synchronize the portable device with the presentation or presentations for captioning, language translation, previews, games, control of devices and/or similar applications. The portable device might be based on existing technologies such as mobile phone, personal digital assistant (PDA) or a combination of both mobile phone and PDA, a custom designed device specifically for this application, or an interactive device. This system can be combined with an existing audio stream for the hearing impaired, descriptions for the blind and/or language translation. For example, the invention may provide for infrared streaming for assistive listening systems.

Possible user device implementations include a custom portable text display terminal having a receiver, display controller, micro-controller, small amount of memory, and power source. Similarly, a custom audio unit having a receiver, digital-to-analog converter, audio amplifier, and speaker, could also be used.

Other devices include talking or motorized toys and games capable of receiving content appropriate to a presentation. Such devices may also allow interaction with nearby units. Special effects units having some combination of lights, audio effects, or animations could also be used. These units could be held by the user or mounted in the presentation space as a remotely controlled device. Still other devices include a digital map or way-finding unit, messaging system that allows the user to broadcast and receive data to and from nearby units, or user identification unit that broadcasts user identity, preferences, or location to nearby units.

The present invention provides several benefits over prior art systems. Prior art systems are not aware of user preferences, such as the user's language, gender, age, etc. Prior art wireless audio systems suffer from signal loss and deterioration of the transmitted audio when the user moves relative to the infrared transmitter. Existing digital wireless audio systems do not have provisions for mixing text or control data in the audio data stream.

The present invention provides for a combination of features not found in prior art wireless data communication systems. For example, the system and method of the present invention allows multiple users' devices to simultaneously receive identical data and remain synchronized with the presentation(s). User devices are able to receive different types of data, such as audio, animation control, text, etc. during a single transmission. User devices are furthermore able to interact with the presentation, interact with the presenters, or interact with each other.

DETAILED DESCRIPTION OF THE PREFERRED EMBODIMENTS

Reference will now be made in detail to an exemplary embodiment of the present invention, an example which is illustrated in the accompanying drawings. It is to be understood that other embodiments may be utilized and structural and functional changes may be made without departing from the respective scope of the present invention.

Figure 1:
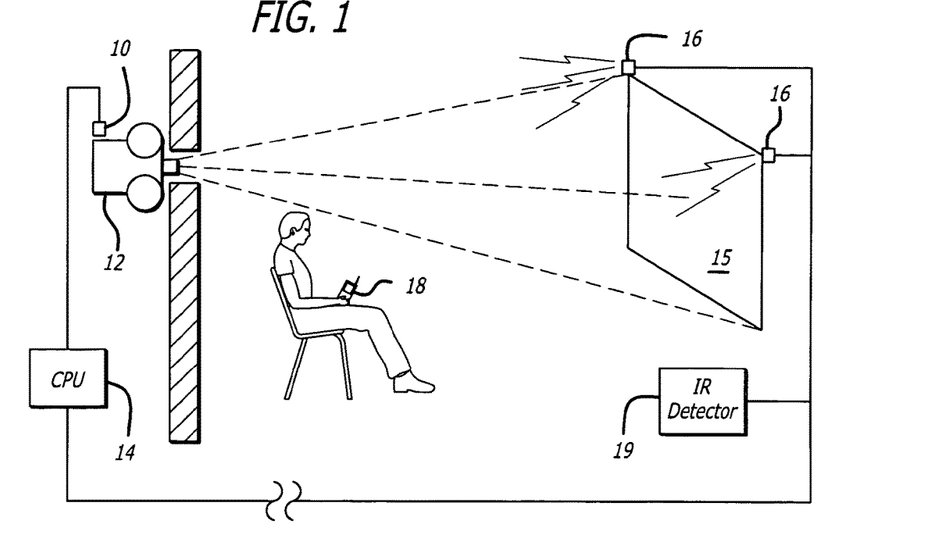
FIG. 1 is a schematic view of a system of the invention utilizing IR signals.
Figure 2:
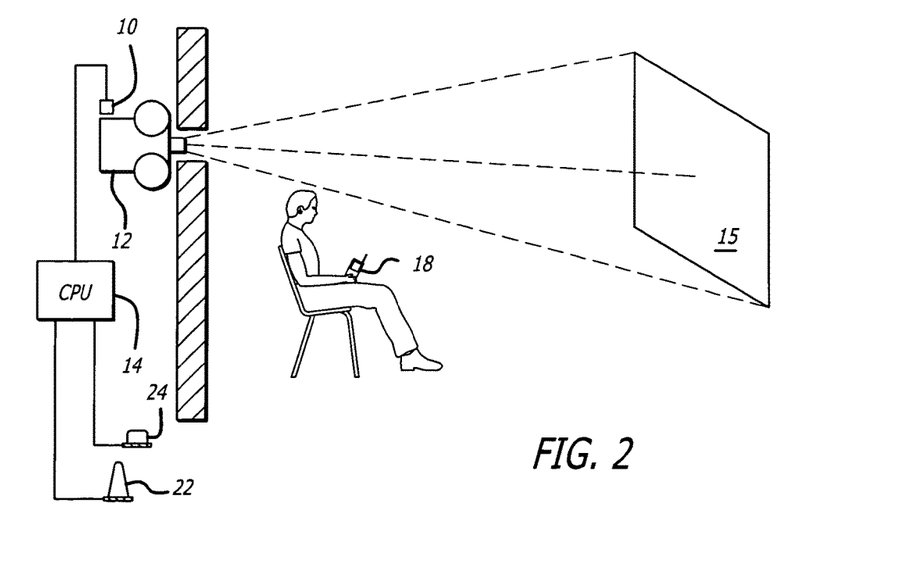
FIG. 2 is a schematic view of a system of the invention utilizing RF signals.

The hardware requirements of the preferred embodiment of this system are depicted in FIGS. 1 and 2. A time code reader 10, which in this embodiment is an optical time code reader, is capable of reading time codes from a show device 12 such as a film projector, show control computer or another media source. The media source may include analog and/or digital content and could be audio, video, and other information (e.g., force feedback parameters for tactile sensing). A central processing unit (CPU) 14 receives the time code signal from the reader 10 and synchronizes the content with the film and/or presentation, which may be a movie screen 15. Examples of content are text captioning, language translation, games and/or other related applications. The central processing unit 14 has the capability to access and interpret the content. The content can reside in the internal memory of the central processing unit 14 and/or as a removable memory media.

The CPU 14 will deliver the synchronized data to the infrared (IR) emitters 16, which are capable of delivering IR messages or control data to a portable device 18, which may be operated either in an indoor or outdoor environment. Alternatively, a low-powered licensed and/or non-licensed radio frequency (RF) system can also be used to deliver the synchronized data to the portable device via an RF signal. FIG. 2 depicts an RF receiver 24 and RF transmitter 22, which interact with a portable RF capable device 18 to achieve the same results as the IR system previously described.

The portable display device 18 has sufficient memory to allow storage of all data to be presented. All required data may be transmitted to the device 18 in one session for display at predetermined times after receipt of a start signal, or the data may be transmitted in a plurality of sessions for display in real time. The stored data may be displayed in its entirety, or a portion of the data may be displayed. The device 18 includes infrared ports capable of receiving and/or emitting infrared messages. Messages emitted from the portable display device 18 are read by one or more IR detectors 19. In an alternative embodiment, the device 18 could also contain RF receiver and/or transmitter ports capable of receiving and transmitting RF messages. The portable device 18 will receive the IR or RF signal and convert the signal to information that can be stored and/or displayed in sync with the presentation. The device 18 may also contain the capability to receive and play audio such as for assistive listening and/or audio language translations, or program material specific to the presentation.

The system could also recognize show/presentation start and/or end signals. The system could then transmit random and/or synchronized information to the patrons possessing a device. This will allow the patrons to interact with the device while waiting for the show/presentation to start or after the show/presentation has ended.

Figure 3:
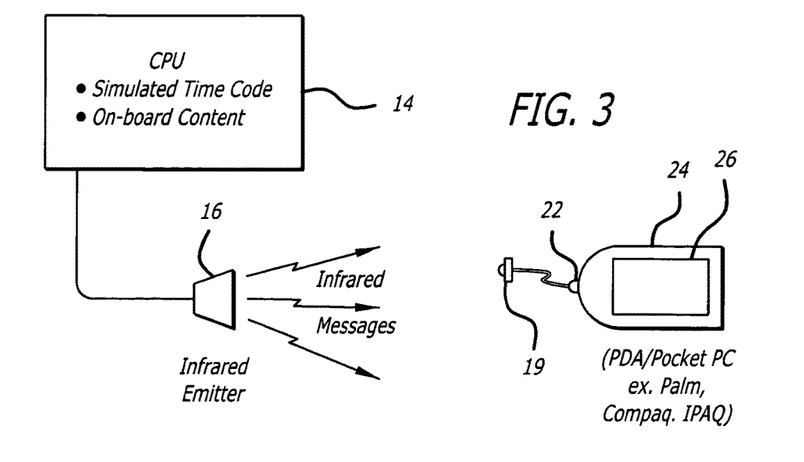
FIG. 3 is a schematic view of a portable display device receiving an IR signal.

One possible application of the invention is depicted in FIG. 3. In this application, time code information is read by the CPU 14, which then accesses on board content, and delivers the synchronized data to the infrared emitters 16, which are in turn capable of delivering IR messages. A portable device 24 receives the IR messages and converts the IR messages to presentable data. In this instance, the IR receiver 19 is a modification to an existing device such as a PDA (for example, a Palm type device) and/or a pocket PC (for example, a Compaq iPAQ) that can store and/or immediately display the data. The IR receiver takes the IR signal from the emitter and translates it to an electronic signal for the serial port 22 of the PDA and/or pocket PC. A terminal software program converts the electronic signal into data that is presented as text on the display screen 26.

This invention may be adapted for uses such as text captioning and language translation in movie or live theaters, consumer products which can provide an interactive experience, and to provide a wireless link for control signals to equipment, devices or products which are used in public presentations.

Figure 4:
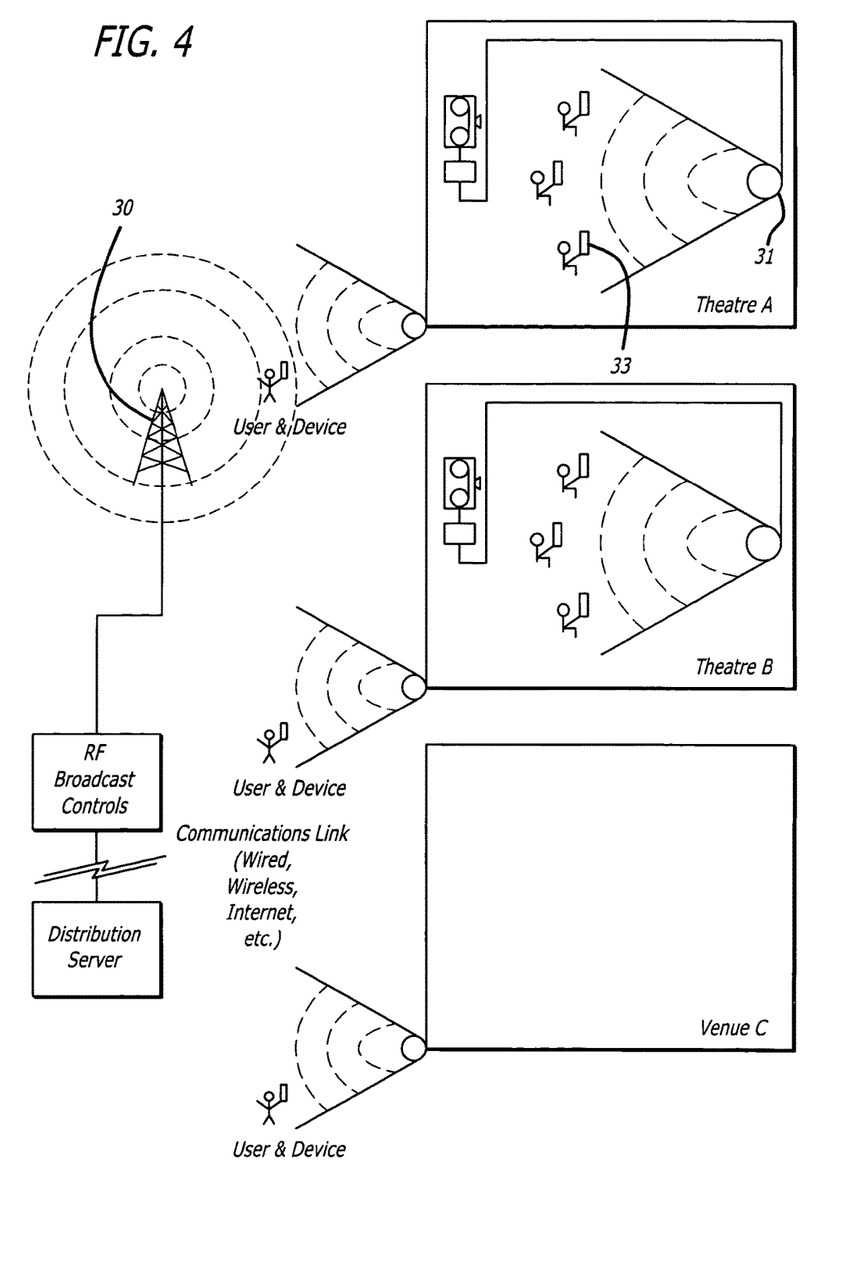
FIG. 4 is a schematic view of an embodiment of the present invention utilizing radio frequency (RF) signals.

Another application of the invention is depicted in FIG. 4. In this application, a combination of RF transmitter 30 and IR emitters 31 broadcast data to portable devices 33. The portable devices have both RF and IR receivers. The RF data stream contains encrypted caption text, digitized audio, and control data for one theater 34 or multiple venues. Each theater or venue has one or more IR emitters that send small amounts of data to synchronize the portable device playback to user position or the theater presentation. An emitter mounted outside one theater's entrance may send an identifying code that the portable device uses to identify that theater. The device then extracts data from the RF stream for that theater's content, and loads the content into the device's memory. Content may include theater name, show times, show synopses, as well as the text and audio for an upcoming show. When the user enters the theater, the device receives IR synchronizing codes for the current show, and the device displays caption text, or play audio, or otherwise synchronize device functions during the show. The IR synchronizing codes are derived from the show media as described earlier.

Figure 5:
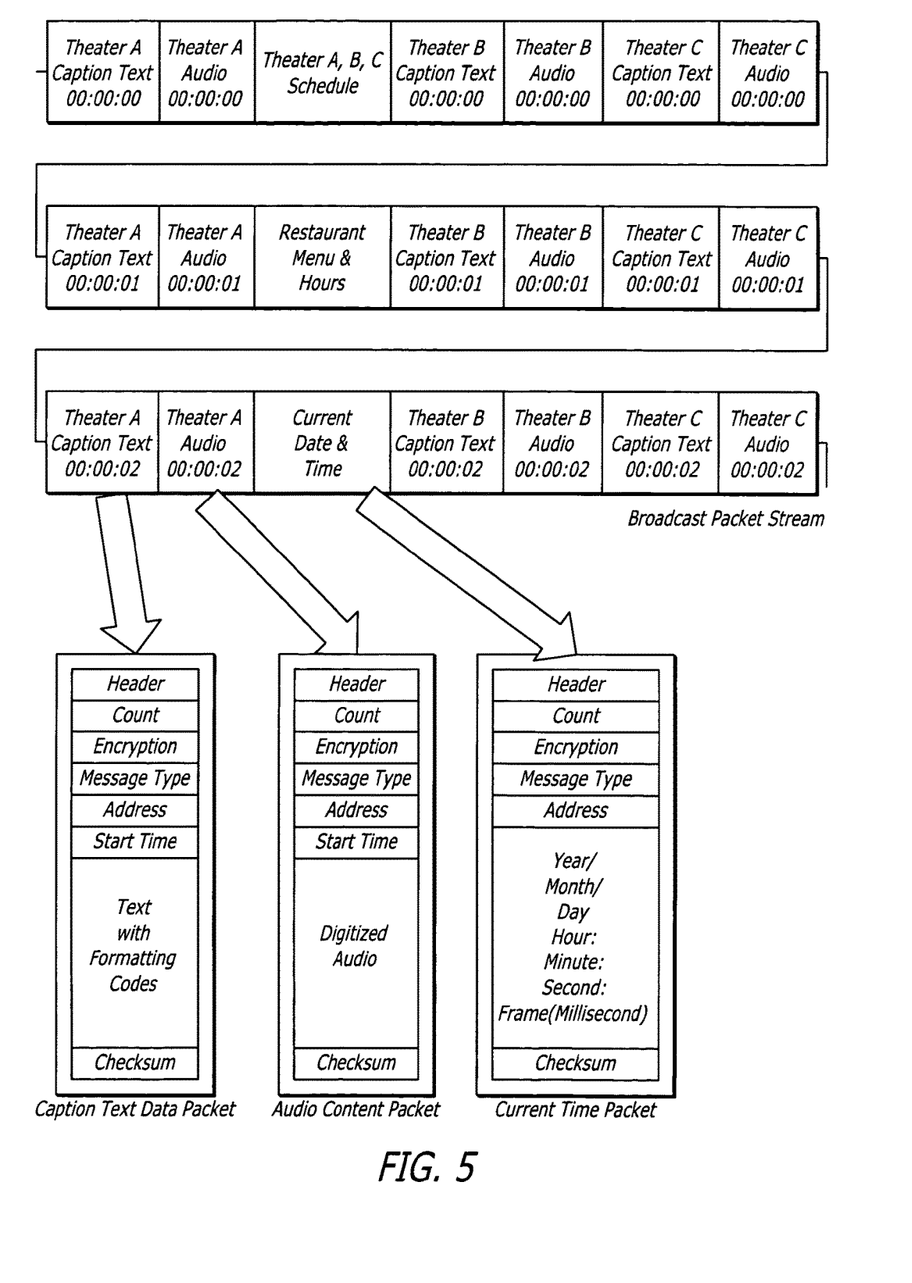
FIG. 5 is an exemplary depiction of a data packet stream delivered by a high speed transmitter.

FIG. 5 illustrates an exemplary embodiment of the basic structure of the data packet stream sent by the high-speed transmitters.

The figure shows a possible broadcast packet stream of theater show content for three theaters, along with data packets of ancillary information such as theater show schedules and current date and time.

The broadcast packet stream contains small groups of data (packets) that contain a small amount of content that will be received by the user devices and, if needed, will be loaded into the user devices local memory. The logical state of each user device determines which packets are loaded into a particular user device. For example, user devices that are in theater A would receive and store content for theater A, but ignore content for theaters B and C. All user devices would receive the current time packet, and use the time data to reset the user device clock. Any user device in front of theater A, B, or C would receive and store the theaters' schedule data. The example packets in the figure show content broken into one-second fragments. So a captioning device in theater A would receive the caption text packet for the 1st second of the show, caption text packet for the 2nd second, etc. Each second of content would be loaded into device memory for access during the show.

A large number of individual packet types are possible, each containing different data such as caption text, audio content, video content, graphics, images, time, schedules, menus, geographical information, game content, survey questions, advertising, warnings, alerts, etc.

Each data packet (refer to examples Caption Text, Audio Content, Current Time Packets in FIG. 5) always starts with a unique Header value that signifies the start of a new data packet.

The data packet also contains a Count value that is used to indicate the amount of following data in the packet. The Count is used to validate the packet and calculate a checksum.

The Encryption data represents key and authentication information. This, and the Checksum, enables the user device to verify that following data in the packet is intended for the device and that the data has not been corrupted. Corresponding key and authentication information are loaded into the user device.

The Message Type value defines the content data in the packet. Based on the Message Type, the user device will determine how to decode the packet data, where to store the data, how and when to use the data. For example, warning text may be immediately displayed; show caption text may be buffered in device memory until an IR synchronizing code triggers that caption text display. Menu or schedule information may be buffered in device memory until the user requests it.

The Address value designates an identifier for a receiving device. This may be a unique address, so the packet is intended for only one user device. Or, the address may specify a block of user devices, such as all captioning devices, or all game devices. Or, the Address may denote the packet as a generic broadcast sent to all devices.

The optional Start Time value acts as a packet sequence number, but may also be used by the receiving user device to define when the packet content is used. As packets are received, the user device will buffer content into its memory in sequence based on start time. As the user device receives synchronizing codes, it will pull content from the sequential memory or search memory for the content with appropriate start time. Additional information such as Caption Text Data with Formatting codes, Digitized Audio content, and Current Time and Frame information are included in the Data Packet Stream.

there is a Checksum information that uses a combination of all the preceding data to verify that the packet has arrived at its location in its entirety.

Figure 6:
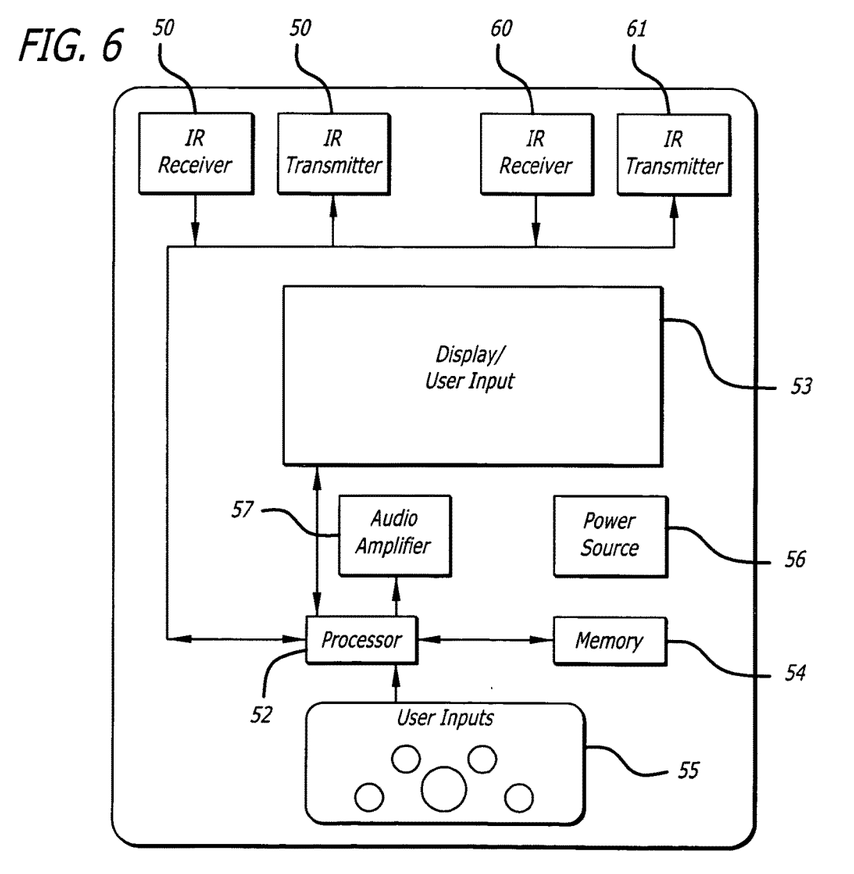
FIG. 6 is an exemplary embodiment of the portable device in accordance with the present invention.

FIG. 6 illustrates an exemplary embodiment of a portable user device in accordance with the present invention. All portable devices have the common elements of an IR receiver 50, RF receiver 60, IR transmitter 51, RF transmitter 61, processor 52, memory 54, and power source 56. Other elements of the devices vary depending on intended applications. In this exemplary embodiment, the portable device has both a display 53 for displaying text and/or graphics, in addition to an audio amplifier 57 for playing sounds, which may be in the form of speech or musical tones. Memory 54 is where the data is stored on the device. The IR receiver 50 receives a code from the wireless transmitter, and processor 52 analyzes the code. The processor 52 interprets the code to determine how to handle it.

If the code is intended for that device, the device searches its memory 54 for content corresponding to the code. The content is then displayed on display 53 and/or plays sound through the audio amplifier 57. The portable device shown in FIG. 5 also shows user inputs 55, such as pushbuttons, which may be used for interactive applications. The high-speed RF transceiver system could be used to transfer content to the portable device, while the IR transceiver system may be used to precisely aim location synchronizing codes to the portable device.

Figure 7A:
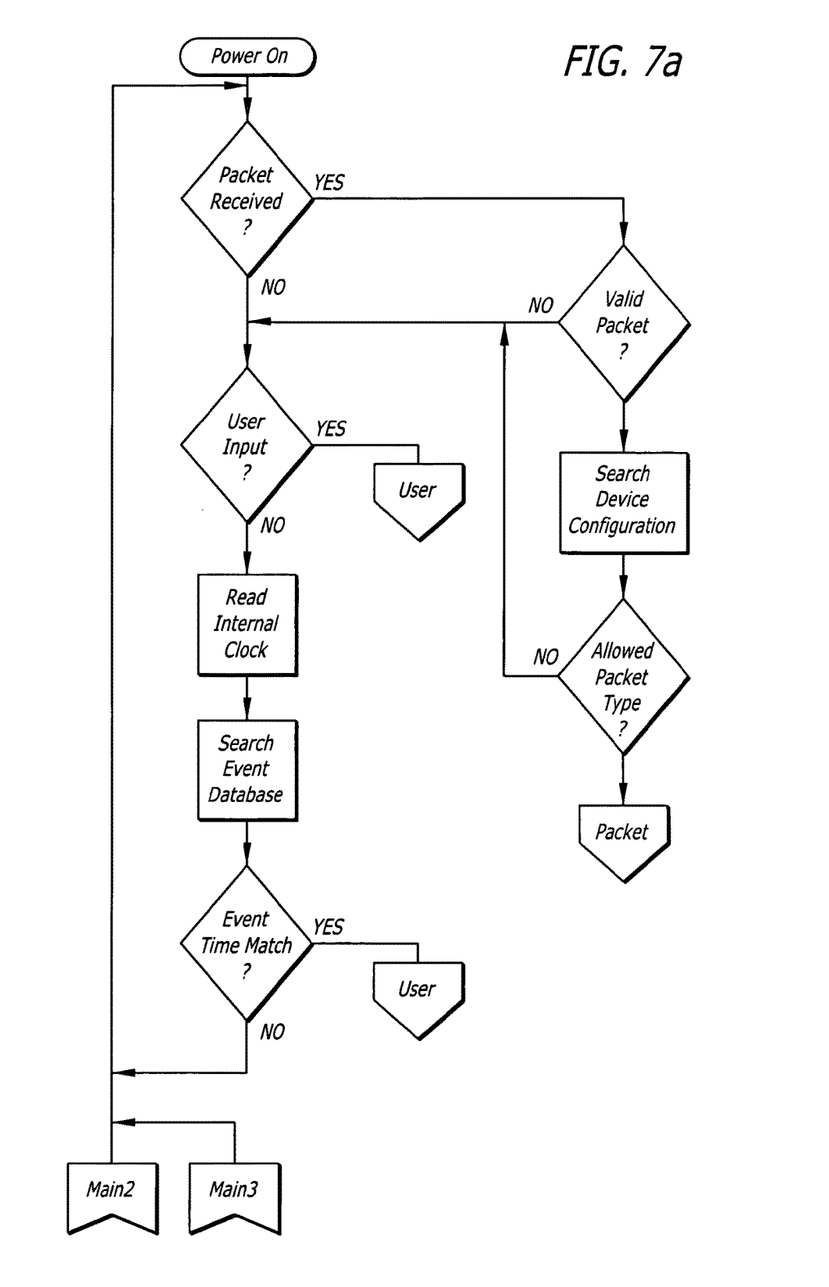
FIGS. 7a-c is a flow diagram in accordance with the teachings of the present invention.
Figure 7B:
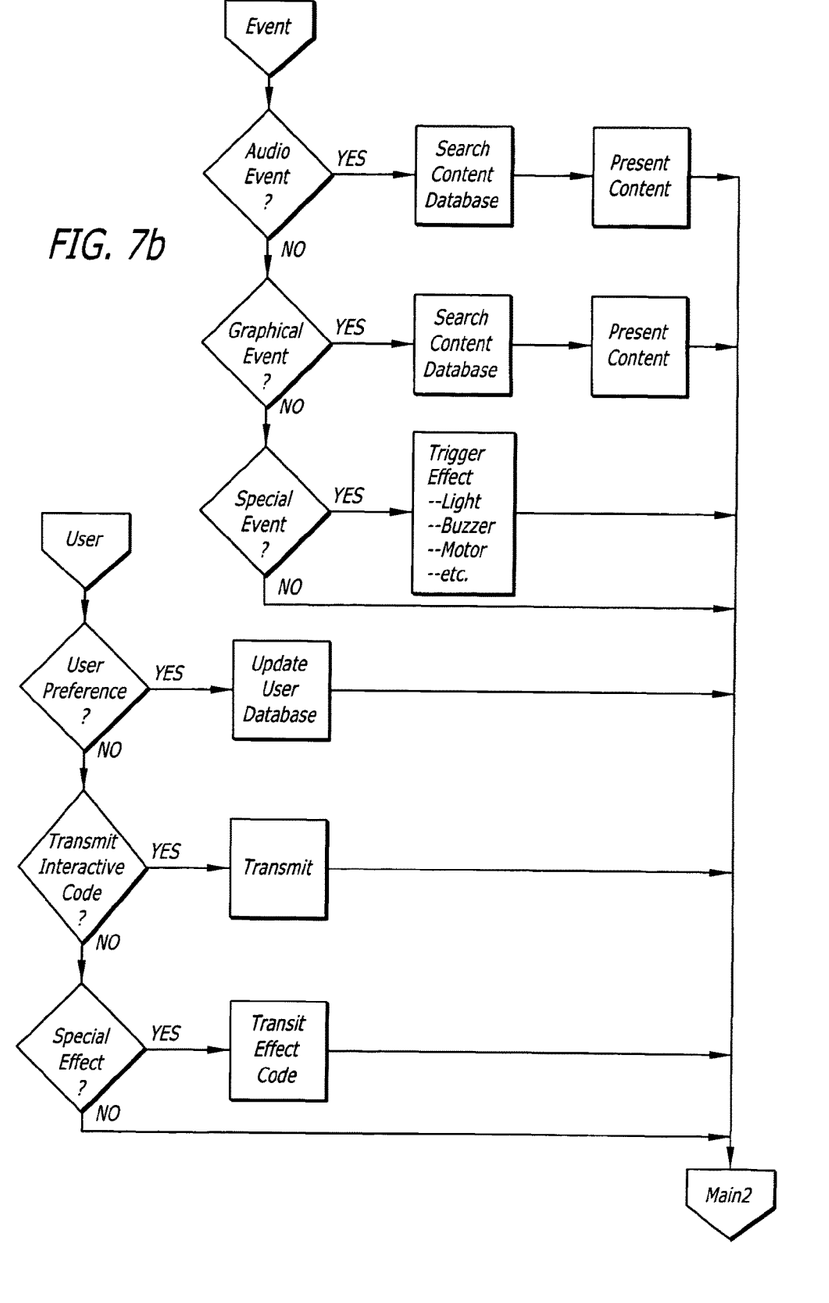
Figure 7C:
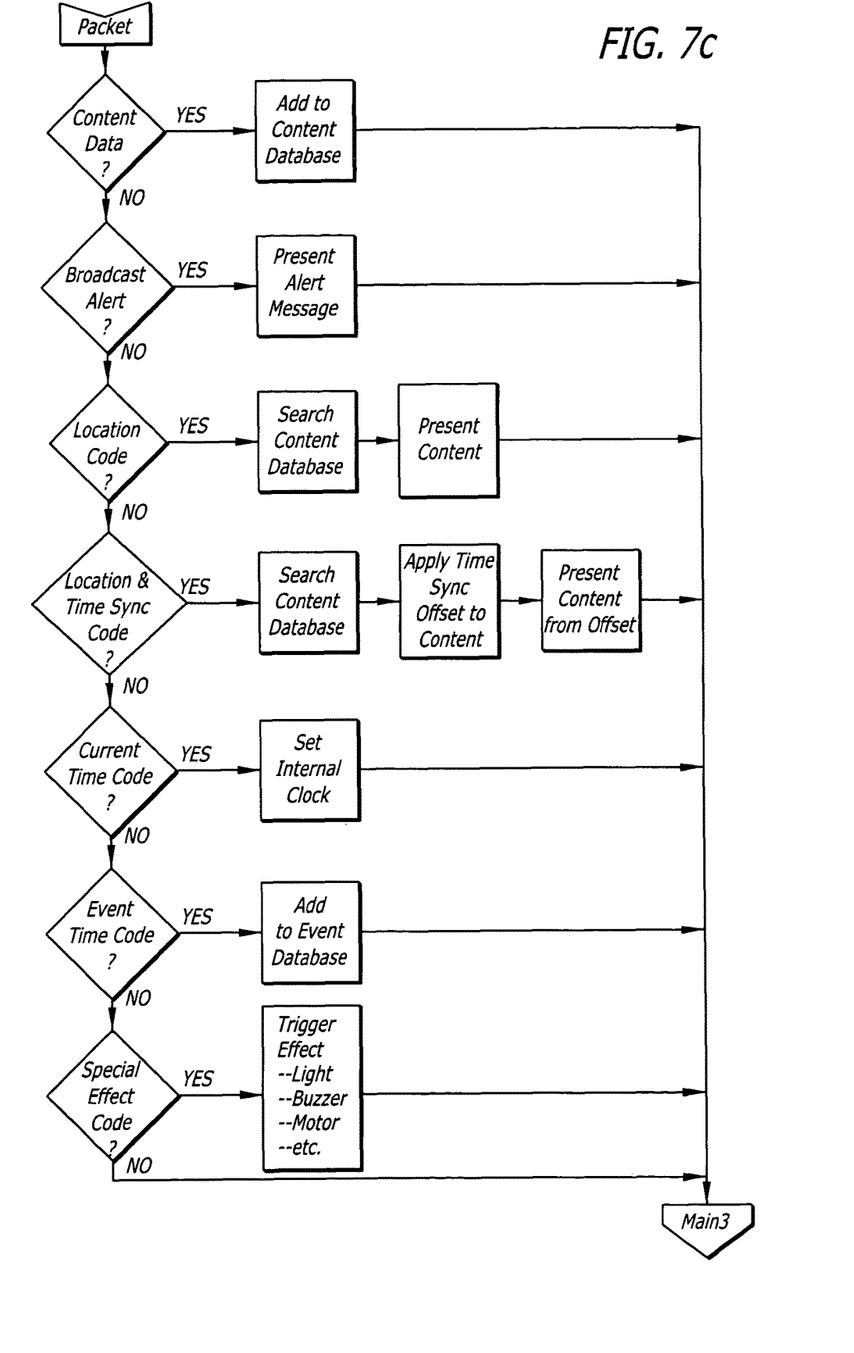

FIG. 7 is a flowchart that shows how received data packets are handled by the user device. After the device is powered on, it is capable of receiving data packets from both IR and RF receivers. The device also monitors user inputs that may come from pushbuttons, touch screen, speech input, assistive devices, etc. The device also periodically reads its clock, and searches its event database memory for preloaded events set to trigger at the current time.

Either receiver may recognize an incoming packet. Any packet that contains timing errors, corrupted data, cannot be authenticated, etc. will be ignored. A packet that has correct bit timing, correct header, can be authenticated, can be decrypted, and has a correct checksum will be marked as valid.

A valid packet will be compared with the user device configuration, so that only appropriate packets will be used. For example, a user device that displays caption text, but has no audio capability, may be configured for text only. That device would ignore packets containing audio content.

The packet message type determines how the device will use the packet data. The packet may contain content such as caption text, audio, or video that is buffered in the user device content database memory for future use. Other data, such as an urgent text alert message, may be sent to the device display immediately. Data such as location and time synchronizing codes may cause the device to search its content database memory, extract the content, and present the content. Current time data may cause the device to reset its internal clock. Event time data will be placed in the device's content database memory, and will be acted on when the internal clock matches the event time. Special effect data may cause the user device to buzz, ring, animate, etc.

The user device may have some number of user inputs available. These may take the form of pushbuttons, touch-screen soft buttons, touch-screen menus, speech input, assistive device such as a breath-operated puff switch, etc. The user may set preferences, such as points of interest, types of movies, age, educational level, etc. The device may use these manually entered preferences, along with learned preferences, to alter the presentation of content. For example, a child's device may be set to display captions using a small English vocabulary. As the child carries the device from location to location in a museum, the device may also "learn", or infer, the child's preference for a certain type of display.

The device may also learn a user's direction of travel, and therefore predict or suggest future destinations. For example, after walking down a hallway towards North, the device may alert the user that the hallway will end, and a turn to the East or West is necessary. Furthermore, the learned direction, along with any learned and manually entered user preferences, may cause the device to deduce a preference for an exhibit that is to the East of the hallway end.

The portable device may automatically infer user preferences from use of the device based on the current location of the user device, the time elapsed at a location, path history (i.e. geographic walking history) of locations visited, and the time elapsed between locations (i.e. walking speed).

User inputs may also be assigned to device hardware functions. For example, an input pushbutton may cause an IR transmitter to send a code to an adjacent device. Such code may identify the user to another user, or identify the user to an automated device, network, etc. One code may cause a door to open, for example, or allow interaction with a game system, etc.

The user device may present content based on internal logic and its internal clock, without receiving data packets. For example, text captions may appear at a predefined time of day to remind a user of venue show times, closing time, or remind the user of medication needed, etc. Further, such time events may be logically constrained by the learned and manually entered user preferences. For example, a restaurant closing time may not be displayed because the user has walked away from the restaurant.

In closing it is to be understood that the embodiments of the invention disclosed herein are illustrative of the principals of the invention. Other modifications may be employed which are within the scope of the invention. Accordingly, the present invention is not limited to that precisely as is shown and described in the present specification.

We claim:

1. A method comprising:
providing content data to a portable device such that the content data is accumulated in a memory of the portable device, the content data including video; and
providing a code to the portable device to trigger the portable device to retrieve a portion of the content data from the memory and play the portion of the content data via the portable device simultaneously with a presentation of a corresponding portion of a media presentation at a media presentation device, the media presentation being distinct from the content data, the media presentation device being distinct from the portable device, the portion of the content data being accumulated in the memory prior to the presentation of the corresponding portion of the media presentation, the media presentation including audio.

2. The method of claim 1, wherein the content data also includes audio.

3. The method of claim 1, wherein the media presentation also includes video.

4. The method of claim 1, wherein the portable device is a toy with talking capabilities.

5. The method of claim 1, wherein the portable device is an assistive listening device.

6. The method of claim 1, wherein the media presentation device is an audio device.

7. A method comprising:
providing content data to a portable device such that the content data is accumulated in a memory of the portable device, the content data including video; and
providing a code to the portable device to trigger the portable device to retrieve a portion of the content data from the memory and play the portion of the content data via the portable device in substantial simultaneity with a presentation of a corresponding portion of a media presentation at a media presentation device such that the portion of the content data is synchronized with the corresponding portion of the media presentation, the media presentation being distinct from the content data, the media presentation device being distinct from the portable device, the portion of the content data being accumulated in the memory prior to the presentation of the corresponding portion of the media presentation, the media presentation including audio.

8. The method of claim 7, wherein the content data includes audio.

9. The method of claim 7, wherein the media presentation includes video.

10. The method of claim 7, wherein the portable device is a toy with talking capabilities.

11. The method of claim 7, wherein the portable device is an assistive listening device.

12. A portable device comprising:
a memory that receives and accumulates content data, the content data including video; and
a processor that receives a code and triggers, based upon the code, the portable device to retrieve a portion of the content data from the memory and play the portion of the content data via the portable device simultaneously with a presentation of a corresponding portion of a media presentation at a media presentation device, the media presentation being distinct from the content data, the media presentation device being distinct from the portable device, the portion of the content data being accumulated in the memory prior to the presentation of the corresponding portion of the media presentation, the media presentation including audio.

13. The portable device of claim 12, wherein the content data also includes audio.

14. The portable device of claim 12, wherein the media presentation also includes video.

15. The portable device of claim 12, wherein the portable device is a toy with talking capabilities.

16. The portable device of claim 12, wherein the portable device is an assistive listening device.

17. A portable device comprising:
a memory that receives and accumulates content data, the content data including video; and
a processor that receives at least a code and triggers, based upon the code, the portable device to retrieve a portion of the content data from the memory and play the portion of the content data via the portable device in substantial simultaneity with a presentation of a corresponding portion of a media presentation at a media presentation device such that the portion of the content data is synchronized with the corresponding portion of the media presentation, the media presentation being distinct from the content data, the media presentation device being distinct from the portable device, the portion of the content data being accumulated in the memory prior to the presentation of the corresponding portion of the media presentation, the media presentation including audio.

18. The portable device of claim 17, wherein the content data also includes audio.

19. The portable device of claim 17, wherein the media presentation also includes video.

20. The portable device of claim 17, wherein the portable device is a toy with talking capabilities.

* * * * *